G. C. KREMER.
TANK HEATER.
APPLICATION FILED JUNE 16, 1919.

1,323,070.

Patented Nov. 25, 1919.
2 SHEETS—SHEET 1.

Witnesses
Edwin F. McKee

Inventor
G. C. Kremer
By Victor J. Evans
Attorney

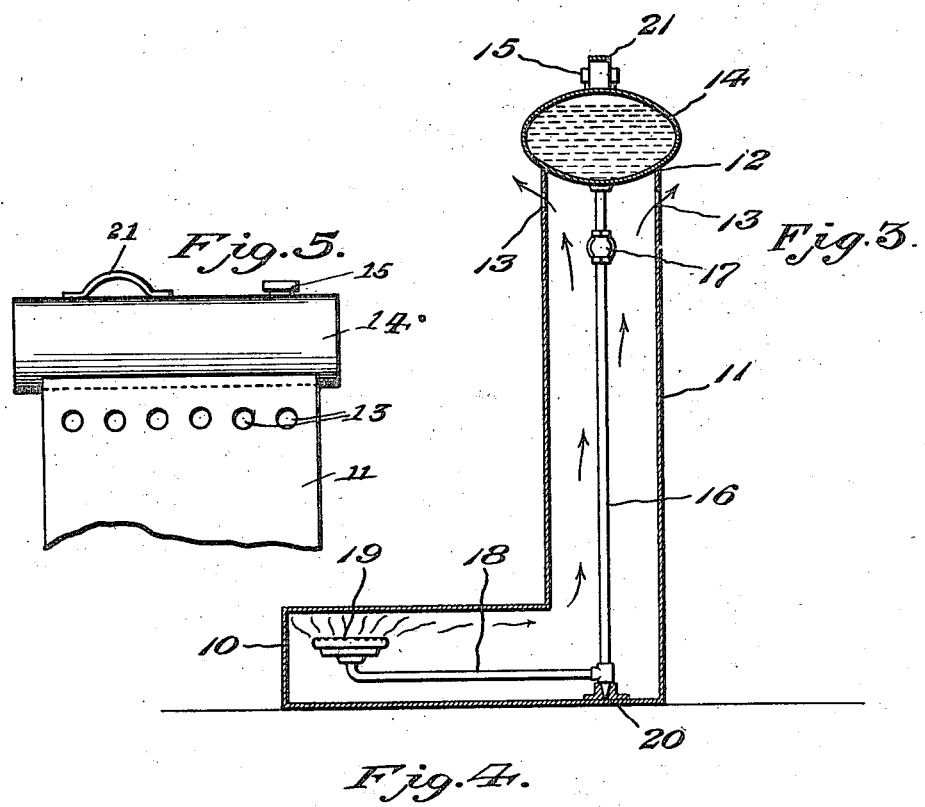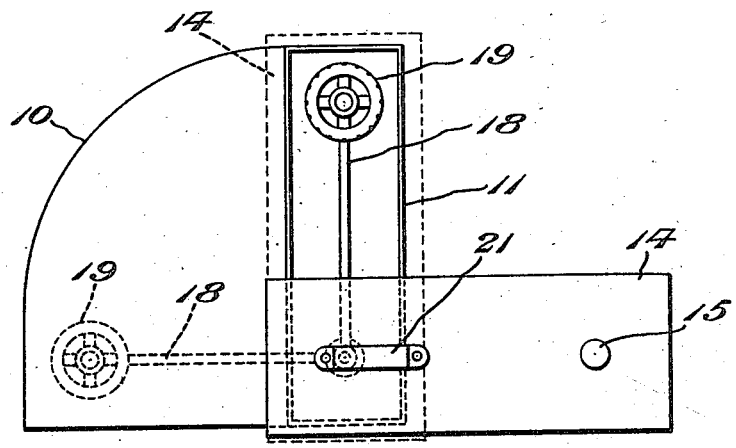

UNITED STATES PATENT OFFICE.

GEORGE C. KREMER, OF DANFORTH, ILLINOIS.

TANK-HEATER.

1,323,070. Specification of Letters Patent. Patented Nov. 25, 1919.

Application filed June 16, 1919. Serial No. 304,667.

*To all whom it may concern:*

Be it known that I, GEORGE C. KREMER, a citizen of the United States, residing at Danforth, in the county of Iroquois and State of Illinois, have invented new and useful Improvements in Tank-Heaters, of which the following is a specification.

This invention relates to tank heaters, that is devices for heating water in tanks for watering live stock and the like during cold weather, and has for its object the provision of a tank heater adapted to be substantially submerged in a tank of water and adapted to burn gasolene as a fuel.

An important object is the provision of a device of this character in which the reservoir tank is movable into non-obstructing relation to the top of the device whereby access may be had to the interior thereof, and in which the burner and its supporting pipe may be swung to be disposed beneath the normal position of the gasolene tank whereby access may be had to the burner for cleaning or lighting the same.

Another object is the provision of a tank heater of this character which has its casing provided with air admitting holes whereby to properly support combustion.

An important object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings, in which—

Figure 1:
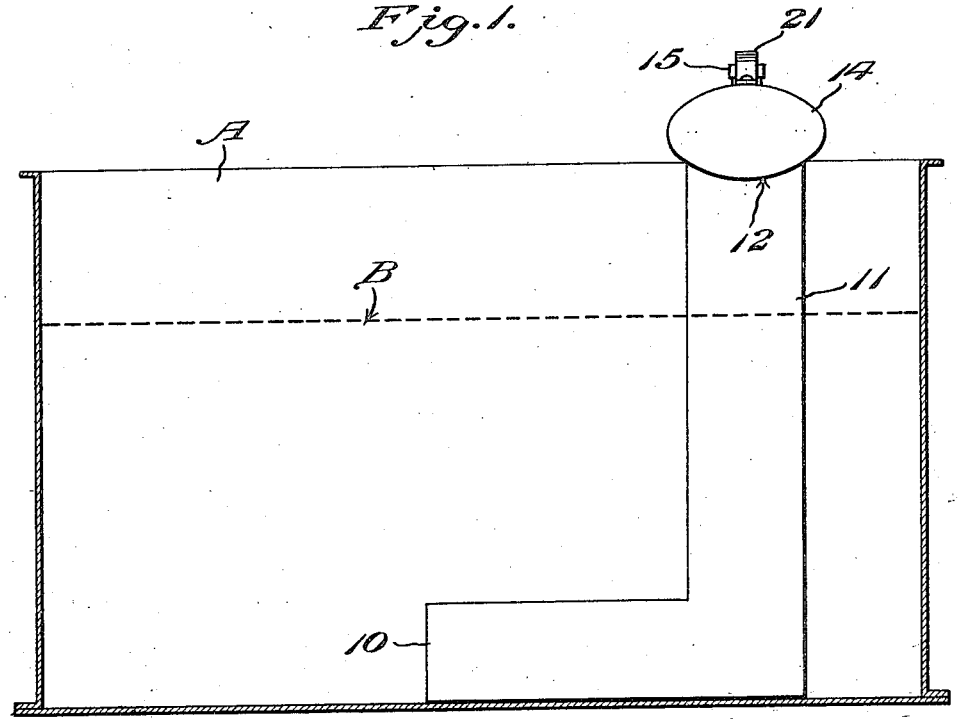
Figure 2:
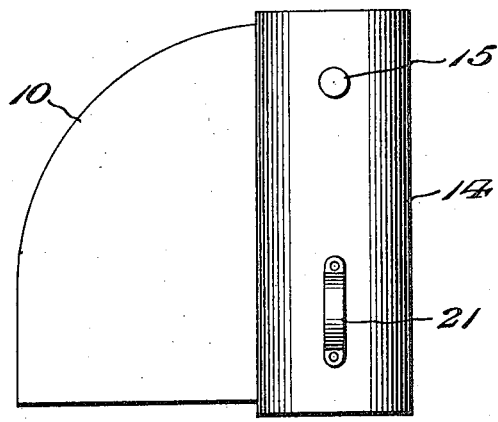

Fig. 1 is a sectional view through a tank showing my device associated therewith, Fig. 2 is a plan view of my device, Fig. 3 is a longitudinal sectional view, and Fig. 4 is a plan view showing the gasolene tank swung to non-obstructing position to permit access to the casing and also showing, by full lines, the burner and associated pipe swung to a position beneath the normal position of the gasolene tank.

Fig. 5 is a fragmentary elevation of the upper end.

Referring more particularly to the drawings, the letter A designates a tank containing water B to be heated.

In carrying out my invention I provide a device adapted to be practically submerged in the water B and this device comprises a tank formed of a lower portion 10 which is formed as one-fourth of a circle. Secured to or formed upon this portion 10 of the tank is a vertically extending portion 11 which communicates at its lower end with the interior of the portion 10 and which has its top 12 concaved and open. Adjacent its top the portion 11 is provided with holes 13 whereby to provide for the admission of air and the exit of products of combustion. The upper wall of the portion 10 does not extend across the bottom of the portion 11, as will be clearly apparent from an inspection of the drawings.

Seated upon the saddle 12 is a tank 14 adapted to contain gasolene and provided with a filling opening 15 normally closed by a cap. This tank 14 fits upon the top of the portion 11 of the casing in such a way as not to interfere with the holes 13. Extending downwardly from the tank 14 and disposed within the portion 11 of the casing is a feed pipe 16 communicating with the interior of the tank 14 and provided with a control valve 17. At its lower end, the pipe 16 is provided with a right angularly extending portion 18 which carries at its extremity a burner 19. At the heel of this angular pipe is provided a bearing 20 for supporting the pipe in proper position.

In the use of the device, it is disposed within the tank A, with the gasolene tank 14 swung into the position shown in Fig. 4 so as to be in non-obstructing relation to the top of the portion 11. This tank 14 may be provided with a handle 21 to facilitate its swinging. When the tank is thus swung, the pipe 16 and its right angular extension 18 carrying the burner 19 will also be swung so as to occupy a position within the portion 10 beneath the portion 11 so that the burner and its associated parts may be cleaned when necessary or so that the burner may be lighted. After the burner is lighted the tank 14 is swung so as to form a closure for the top of the portion 11, whereupon the pipe extension 18 carrying the burner 19 will be disposed within the portion 10 remote from the portion 11, as shown by dotted lines in Fig. 4. The heat generated by combustion of the fuel at the burner 19 will then serve effectually to heat the portion 10 of the casing and consequently the water within which it is immersed. Owing to the provision of the holes 13 the products of combustion may escape and fresh air may be inducted into the portion 10 of the casing.

From the foregoing description and a study of the drawings it will be apparent that I have thus provided a very simple and inexpensive device adapted to be disposed within a tank of water to be heated whereby the water will be very effectually heated with the consummation of but a slight amount of fuel and in a thoroughly clean and efficient manner.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A device of the character described comprising a casing including a lower horizontal portion and a vertical portion at one edge of said horizontal portion and communicating therewith, the upper end of said vertical portion being open, a reservoir tank normally seated upon and forming a portion for the upper open end of said vertical portion, a feed pipe extending downwardly from said tank and provided at its lower end with a laterally extending portion, and a burner upon the free end of the lateral portion of said pipe.

2. A device of the character described comprising a casing including a lower horizontal portion and a vertical portion at one edge of said horizontal portion and communicating therewith, the upper end of said vertical portion being open, a reservoir tank normally seated upon and forming a portion for the upper open end of said vertical portion, a feed pipe extending downwardly from said tank and provided at its lower end with a laterally extending portion, and a burner upon the free end of the lateral portion of said pipe, said reservoir tank being movable into a position at right angles to the major axis of said vertical portion with said lateral branch of said pipe and said burner disposed beneath said vertical portion.

3. A device of the character described comprising a casing including a horizontal portion formed as a fourth of a circle and further including a vertical portion formed at one edge of and communicating with said horizontal portion, the upper end of said vertical portion being open and the side walls thereof being provided with a plurality of holes, a reservoir tank seated upon and normally closing the top of said vertical portion, a feed pipe extending downwardly from said tank and having its lower end provided with a lateral extension disposed within said horizontal portion of said casing, and a burner on the free end of said extension, said tank being movable to be disposed at right angles to the longitudinal axis of said vertical portion with said extension pipe and burner disposed below the lower end of said vertical portion.

In testimony whereof I affix my signature.

GEORGE C. KREMER.